United States Patent

Ogawa et al.

[11] Patent Number: 6,115,739
[45] Date of Patent: *Sep. 5, 2000

[54] IMAGE SCANNER ADAPTED FOR DIRECT CONNECTION TO CLIENT/SERVER TYPE NETWORK

[75] Inventors: Nobuo Ogawa; Nobuo Kanemitsu, both of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/685,638

[22] Filed: Jul. 24, 1996

[30] Foreign Application Priority Data

Jul. 25, 1995 [JP] Japan .................................. 7-188938

[51] Int. Cl.[7] ................................................ G06L 13/38
[52] U.S. Cl. ...................... 709/215; 709/203; 358/1.15; 358/403; 358/407
[58] Field of Search .................................. 358/400, 1.15, 358/434, 468, 402, 403, 407, 408; 395/326, 188.01, 200.02, 200.88, 858; 364/200; 355/321; 382/47; 709/203, 215, 216

[56] References Cited

U.S. PATENT DOCUMENTS

| | | | |
|---|---|---|---|
| 4,941,084 | 7/1990 | Terada | 364/200 |
| 5,113,455 | 5/1992 | Scott | 382/47 |
| 5,237,430 | 8/1993 | Sakurai . | |
| 5,396,341 | 3/1995 | Takahashi et al. | 358/400 |
| 5,452,068 | 9/1995 | Farrell | 355/321 |
| 5,532,841 | 7/1996 | Nakajima et al. . | |
| 5,537,547 | 7/1996 | Chan et al. | 395/200.02 |
| 5,604,860 | 2/1997 | McLaughlin | 395/326 |
| 5,644,711 | 7/1997 | Murphy | 395/188.01 |
| 5,740,428 | 4/1998 | Mortimore et al. | 395/615 |

FOREIGN PATENT DOCUMENTS

0610875A1  8/1994  European Pat. Off. .

OTHER PUBLICATIONS

Patent Abstracts of Japan, vol. 017, No. 317 (E-1382), Jun. 16, 1993.

*Primary Examiner*—Thomas C. Lee
*Assistant Examiner*—Rehana Perveen
*Attorney, Agent, or Firm*—Arent Fox Kintner Plotkin & Kahn, PLLC

[57] ABSTRACT

A network system includes a) an image scanner which is connected to a network, reads an images, and includes an input device for inputting identification information on a user; and b) a file server connected to the image scanner over the network. The file server includes directories which are created in advance in one-to-one correspondence to users and in which image data read by the image scanner is stored, and a memory in which the relationships of correspondence between identification information on users and the directories associated with the users are stored. When image data is input from the image scanner, the file server stores the image data in a directory associated with identification information input from the image scanner. Due to this configuration, an image scanner usable when connected directly to a client/server type network such as a LAN can be provided. Supposing an image scanner connected to a network is used as a copier or facsimile, it is possible to obviate the necessity of mounting unwanted keys on the image scanner.

35 Claims, 10 Drawing Sheets

USERNAME: M3096NT0
PASSWORD: M3096NT0

```
DIRECTORY.DIR
DIR        ID       USERNAME  MAIL  MAIL ADRS
00000001   873781   NOGAWA    Yes   NOGAWA
00000002   653521   SFUJII    No
00000003   235215   MWADA     No
```

IMAGE SCANNER ADAPTED FOR DIRECT CONNECTION TO CLIENT/SERVER TYPE NETWORK

BACKGROUND OF THE INVENTION

1. Field of the Invention

The present invention relates to an image scanner, or more particularly, to an image scanner to be connected to, and used with, a client/server type network.

2. Description of the Related Art

As the use of recent computer systems tends towards networking, application software and peripheral equipment have come to be designed on the assumption that they may be connected to a network such as a local area network (LAN). As for peripheral equipment, those which can be directly connected, and used, with a network are in demand. For example, some printers can be connected directly to a LAN. High-speed sophisticated equipment are expensive to use personally. However, if such peripheral equipment are connected with the LAN and shared by a workgroup, it becomes possible to enjoy the use of such expensive equipment. An image scanner or the like is also required to be usable on a network.

In a prior art, connecting an image scanner to a network requires connecting a personal computer (PC) or workstation (WS) between the image scanner and the network.

FIG. 1 shows an example of a configuration of a conventional client/server type network. In the drawing, reference numeral 1 denotes a file server. 2 denotes an image scanner. 3 denotes a work station (or view station). 4 denotes a personal computer (PC) used to connect the image scanner to a network.

An image scanner is, unlike a printer, an input unit. It is therefore necessary to input information such as a resolution for reading, a size of an original to be read, a type of image processing, and this information must be input using a personal computer. The contents of the information are dependent on the application to be used, and must be designated using a graphical user interface (GUI).

For using an image scanner connected directly to a network, unlike using an output unit such as a printer, the image scanner is required to perform such processing as an operation for logging in, designation of addresses on the network, and designation of a file name. However, a full keyboard and display are needed for inputting these information in practice. For connecting an image scanner with a network, therefore, it is substantially necessary to interpose a personal computer (PC) between them.

Furthermore, it is required that the image scanner can be used as a copier or facsimile. In this case, for setting numerous information items, it is required to mount many input keys on an operator panel of the image scanner.

These input keys are unnecessary for the image reading that is the normal function of an image scanner. In consideration of cost, it is hard to adapt the input keys to an image scanner in practice. If the input keys were adaptable to an image scanner and only keys covering the capability of a copier were mounted, the input keys would be insufficient to realize the capability of a facsimile.

As mentioned above, in the prior art, it is very hard to connect an image scanner directly to a network in terms of cost and connectivity. For example, in the case of operating an image scanner on a network, it is necessary to log in relative to the network. However, it is a problem how an image scanner should log in relative to the network. For entering a user name and password which are essential for logging in, the use of a personal computer is a must.

In an effort to resolve this point, a proposal has been made for a system in which: a user name, password, and the like are described on a cover sheet and read using an image scanner; character recognition is performed; and the results of recognition are then set. However, it is hard for the success rate of character recognition to attain 100% and incorrect recognition is unavoidable. This system is therefore impractical.

A method in which an image scanner is provided with a full keyboard and a display for displaying information to be input is also conceivable. However, this method is disadvantageous in terms of cost even when compared with the system using a personal computer. The method is therefore not preferable.

SUMMARY OF THE INVENTION

A major object of the present invention is to provide an image scanner usable when connected directly to a client/server type network such as a LAN or the like.

Another object of the present invention is to obviate the necessity of mounting unwanted keys on an image scanner to allow using the image scanner connected to a network as a copier or facsimile.

According to the fundamental aspect of the present invention, there is provided a network system comprising: an image scanner that is connected to a network, reads an image, and includes an input means for inputting identification information on a user; and a file server connected to the image scanner over said network, wherein: said file server includes directories which are created in advance in one-to-one correspondence to users and in which image data read by said image scanner is stored, and a memory means in which the relationships of correspondence between identification information on users and the directories associated with the users are stored; and when image data is input from said image scanner, said file server stores the image data in a directory associated with identification information input from said image scanner.

Thus, the image scanner can be used when connected directly to a network such as a LAN or the like.

In a preferred embodiment of the present invention, the image scanner comprises means for receiving a message output when the file server halts, means for disconnecting the link with the network by receiving the message, and means for notifying a user of the fact that the image scanner is disabled.

Thus, even if the file server halts with the image scanner connected to the network, the disabled state of the image scanner can be reported to a user.

Also, according to another aspect of the present invention, there is provided a network system comprising: an image scanner that is connected to a network, reads an image, and includes a compression/expansion means for compressing or expanding data including image data; a terminal connected to said image scanner over said network; and a file server that is connected to said image scanner and said terminal over said network and includes a memory means in which image data is stored, wherein: in response to a request sent from said terminal, said file server transfers image data stored in said memory means to said image scanner, and instructs said image scanner to perform compression or expansion on said image data; and said compression/expansion means compresses or expands image data transferred from said file server on the basis of an instruction sent from said file server.

Thus, the compression or expansion function implemented in the image scanner can be shared by the whole network, and resources can be used effectively.

Also, according to still another aspect of the present invention, there is provided a network system comprising: an information input terminal including a radiocommunication interface; an image scanner that is connected to a network, reads an image, and includes a radiocommunication interface for communication with said information input terminal; and a file server connected to said image scanner over said network, wherein: information to be output to said network is input from said information input terminal; and the input information is transferred to said image scanner via said radiocommunication interface and further transferred from said image scanner to said file server.

Thus, wanted information can be input from, for example, a personal digital assistant (PDA). In particular, the image scanner need not be provided with a full keyboard or the like.

BRIEF DESCRIPTION OF THE DRAWINGS

Other objects and features of the present invention will be described hereinafter in detail by way of preferred embodiments with reference to the accompanying drawings, in which:

FIG. 4 is a diagram showing a file structure defining the association between IDs concerning an image scanner and directories;

FIG. 5 is a diagram showing the relationships among directories and associated IDs, user names, and the like;

DESCRIPTION OF THE PREFERRED EMBODIMENT

Figure 1:
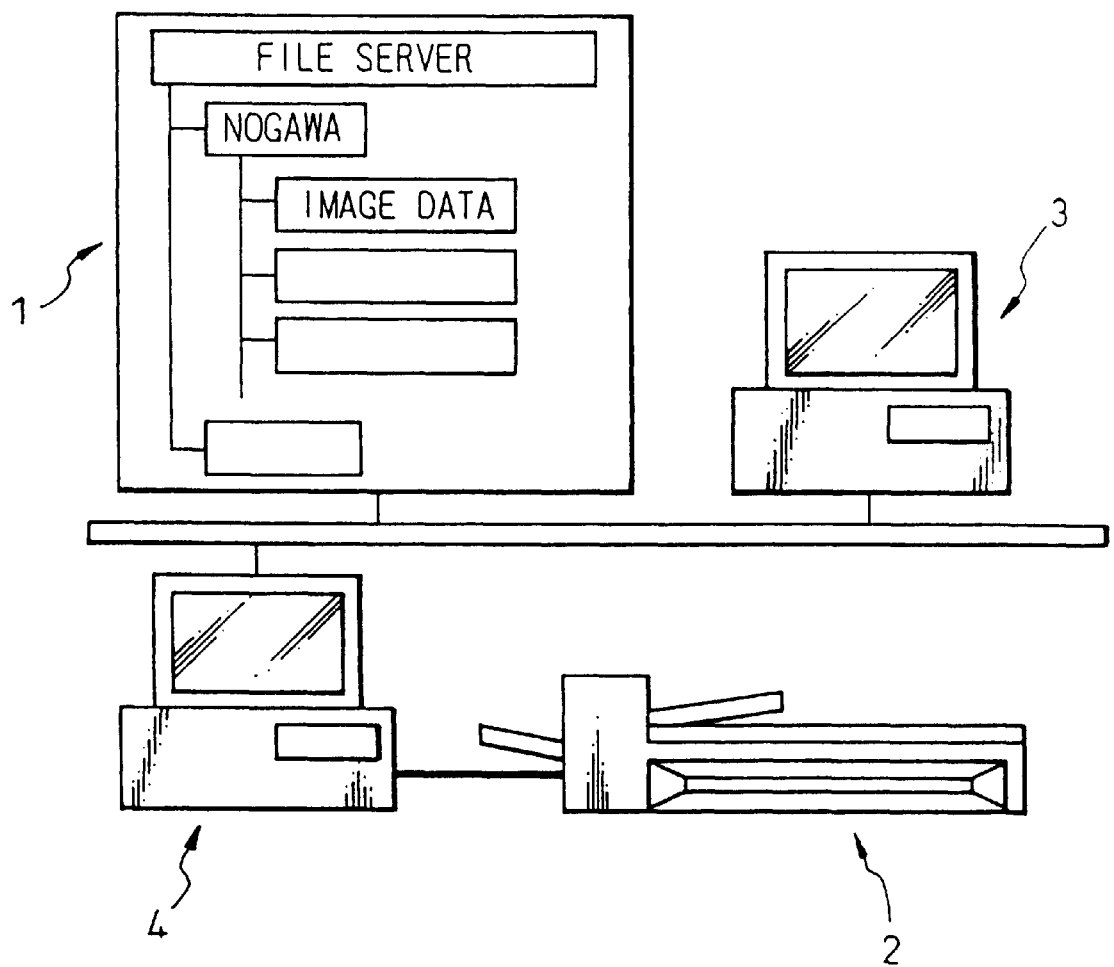
FIG. 1 is a diagram showing the configuration of a conventional client/server type network.
Figure 2:
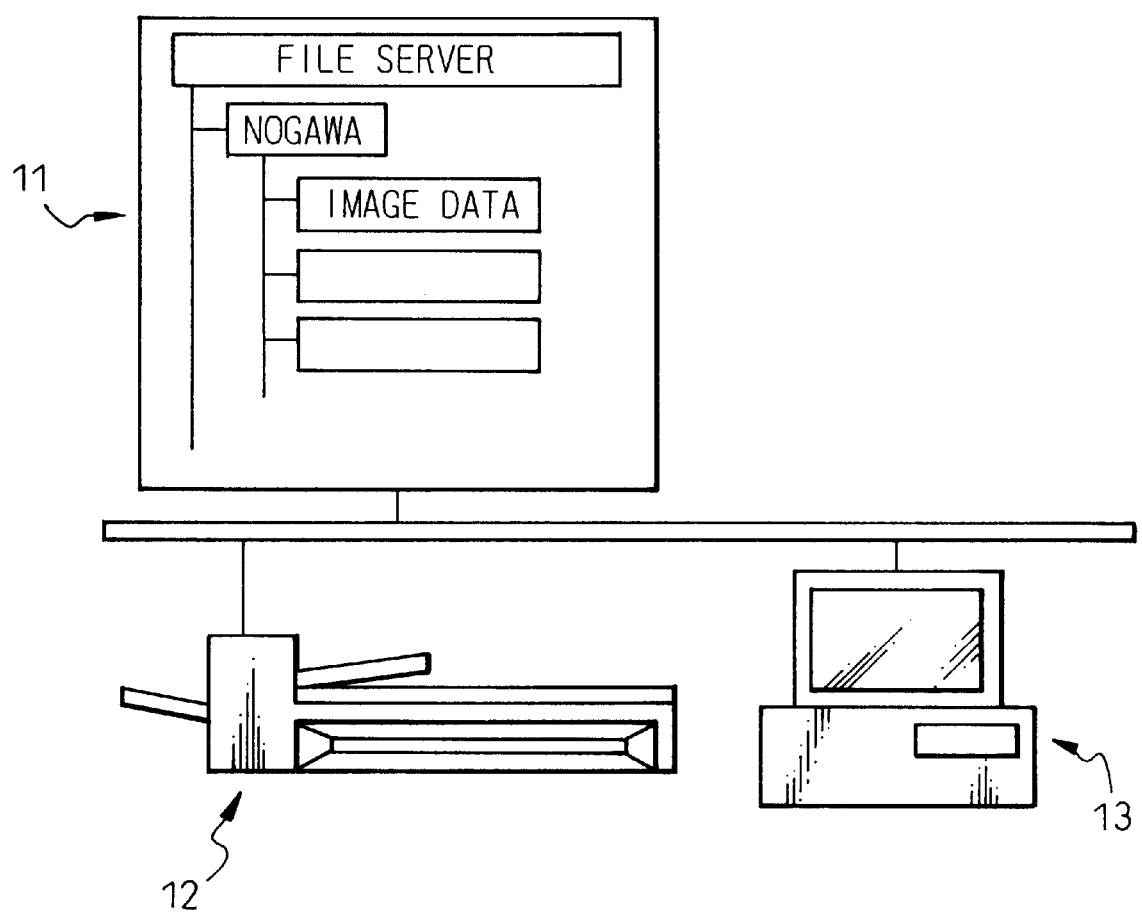
FIG. 2 is a diagram showing the configuration of a client/server type network in accordance with a first embodiment of the present invention.

FIG. 2 shows the configuration of a client/server type network in accordance with the first embodiment of the present invention.

In the drawing, reference numeral 11 denotes a file server. 12 denotes an image scanner. 13 denotes a view station. The image scanner 12 and view station 13 are connected to the file server 11 over a network. The file server 11 stores image data read by the image scanner 12. The image scanner 12 is provided with an operator panel (to be described later). The image scanner 12 includes a reader for reading an image on an original, an output unit for outputting data of the read image, a memory for storing an identification code inherent to the image scanner, and a control unit for outputting the identification code to the network when the power supply is turned on and for performing connection with the network. The view station 13 is used to manipulate and display image data stored in the file server 11.

Figure 3:
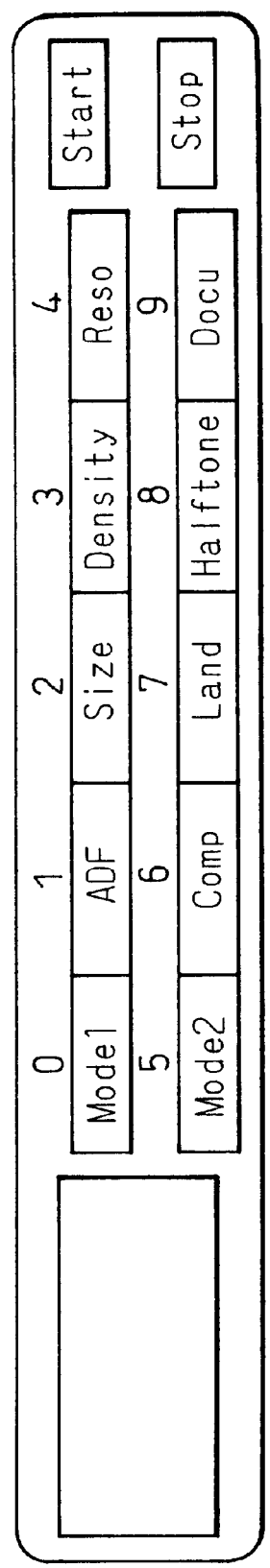
FIG. 3 is a diagram showing the components of an operator panel of an image scanner.

FIG. 3 shows the components of an operator panel of the image scanner in accordance with this embodiment. As illustrated, the operator panel of the image scanner has 12 input keys. Among them, two keys are keys used to instruct start and stop of reading. The remaining ten keys are used for various kinds of setting, and also serve as numerical value input keys associated with 0 to 9.

Figures 4, 5:
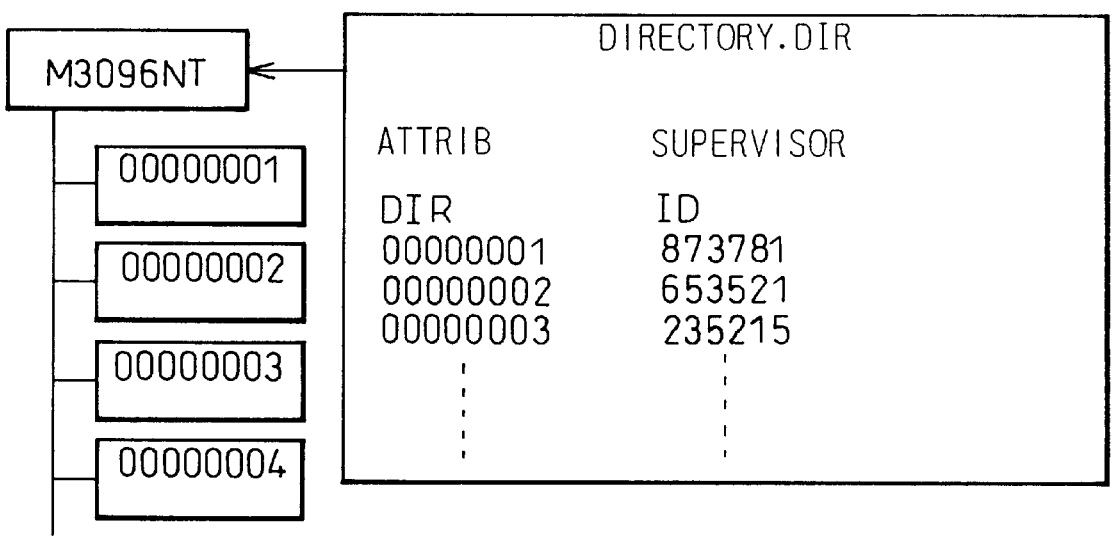

FIG. 4 shows a file structure defining the association between IDs concerning the image scanner of this embodiment and directories in which image data is stored.

In the drawing, a user name "USERNAME" specifies a name of a user of the image scanner. A password "PASSWORD" specifies a password associated with the image scanner. In the example shown in FIG. 4, "M3096NT0" is set for both the user name and password. The user name and password need not be the same at all. The user name and password are defined in advance exclusively for the image scanner by means of administration software. This enables automatic logging in relative to a network. When the power supply is turned on, the image scanner is automatically allowed to log in with the file server.

In this case, an original must be input to directories associated with registration data items. A file for associating the data items with the directories is created in a designated directory by the administration software. The administration software is run by a super-user. An access authority and security can be set within the administration software. User name M3096NT0 need therefore not be registered as a super-user.

Logging in with a network does not require a keyboard in particular, because a user name is a given one unique to each image scanner.

Identifying an individual user is achieved by referencing an associative file that resides in the designated directory.

Each user of the image scanner registers his/her own ID information in a directory associative file shown in FIG. 4 in advance. In the example shown in FIG. 4, "873781" is set as an ID in a first directory. "653521" is set as an ID in a second directory. "235215" is set as an ID in a third directory. It is seen that the directories are associated with the users. For using the image scanner, an own ID is entered at the operator panel. Thus, a file is preserved in a given directory.

For inputting parameters, values are designated at the operator panel. However, since an ID is not input simultaneously with setting of parameters, definition must be performed twice.

In the example shown in FIG. 4, dedicated directories are created. The use of an associative file makes it possible to modify IDs or change associated directories. In addition, if the image scanner is always retained in a log-on state, a procedure for connecting the image scanner with a network at every input of an image can be omitted. Processing using the image scanner can be speeded up.

In electronic filing linked with a work flow, inputting an original and indexing data are carried out as different kinds of work. In the conventional connection with a LAN via a personal computer, an input worker is requested to enter an image, and then transmit a message to a file server by mail or the like so as to report completion of input work of an original.

However, the image scanner can detect the completion of original input work. Besides, since the image scanner is connected directly with the LAN, the image scanner can transmit a message reporting the completion of original input work simultaneously with detection of the completion of original input work.

FIG. 5 shows the relationships of correspondence among directories and associated IDs, user names, data indicating issuance or non-issuance of mail, and mail addresses.

Similarly to FIG. 4, in FIG. 5, "873781" is set as an ID in a first directory, "NOGAWA" is set as a user name therein, and "Yes" indicating issuance is set as data indicating issuance or non issuance of mail therein. Likewise, in second and third directories, IDs and user names are set. However, "No" indicating non-issuance of mail is set for the users associated with the second and third directories.

As mentioned above, issuance or non-issuance of mail is set using a flag. It is thus, determined whether it is or is not required to transmit an input completion message to the file server. Moreover, the receivers and contents of messages are also described in the list shown in FIG. 5.

This system an apply to a multi-function peripheral (MFP) using networking equipment.

For example, for the capability of a copier, in addition to the aforesaid logging in with a network, designating an output destination printer is needed. This kind of setting is as hard as connection with a network. Besides, since it is required to install a driver for a printer in the image scanner, a disk drive or dedicated disk driver must be developed.

Figure 6:
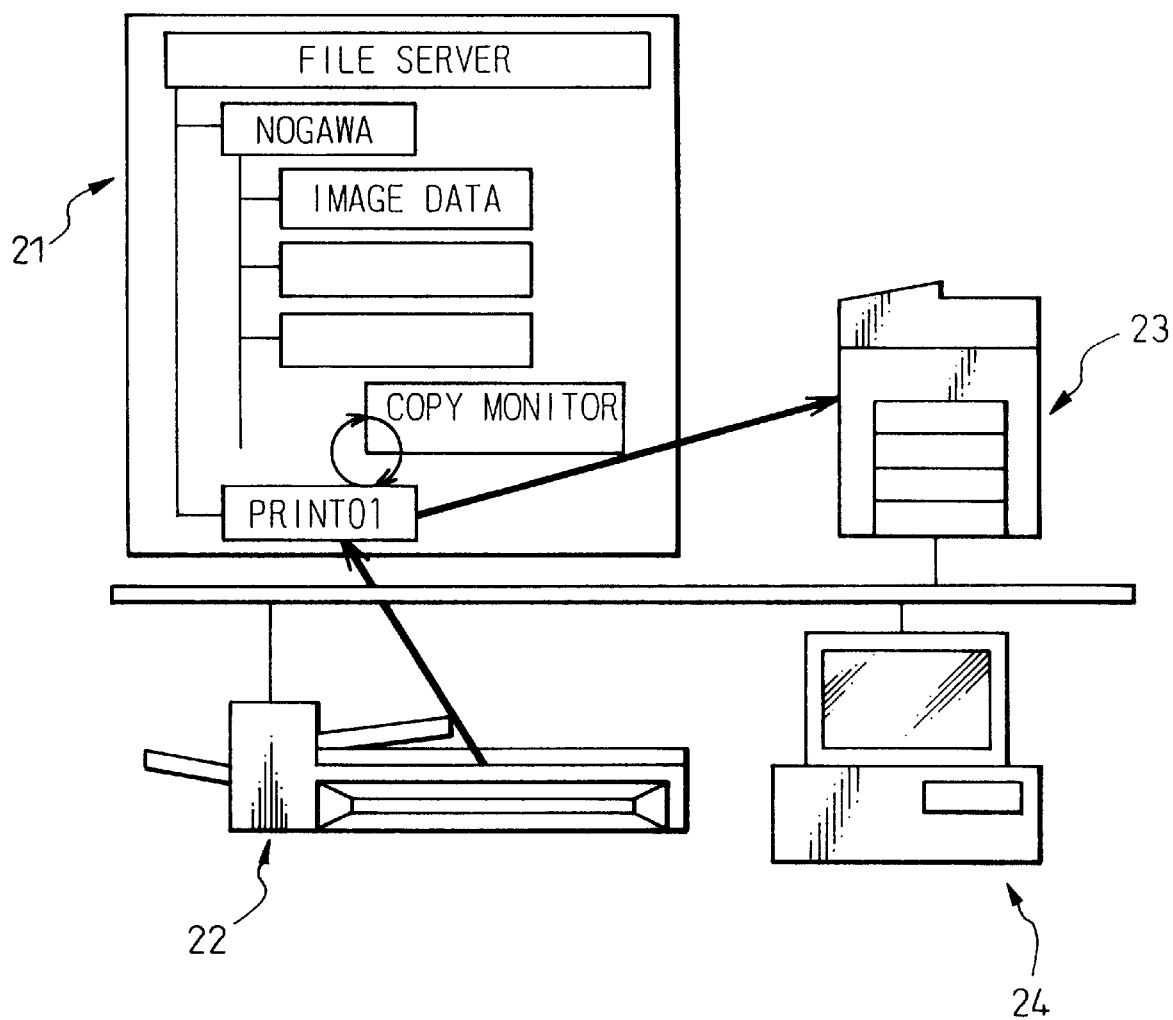
FIG. 6 is a diagram showing the configuration of a client/server type network in accordance with a second embodiment of the present invention.

FIG. 6 shows the configuration of a client/server type network in accordance with the second embodiment of the present invention. In this example, the configuration of network over which the capability of a copier is utilized is presented.

In the drawing, reference numeral 21 denotes a file server. 22 denotes an image scanner. 23 denotes a printer serving as an output destination. 24 denotes a view station. In the file server 21, "PRINT01" indicates a directory used for the capability of a copier. Information concerning a result of copy and the presence or absence of an error is stored in the directory PRINT01.

In this embodiment, a directory (PRINT01) associated with the output destination printer 23 is created in the file server 21. The directory is identified with an ID in the same manner as that in the aforesaid first embodiment. Specifically, when the ID is designated, the information concerning a result of copy and the presence or absence of an error is stored in the directory.

Within the file server 21, a resident monitor program ("COPY MONITOR" in the drawing) for monitoring the input of image data and outputting the image data is produced. In this case, a device driver supported by an OS that is run by the file server 21 can be used as a device driver for the printer 23. The printer 23 can therefore be designated with flexibility.

For copying, generally, security is not in particular important. Moreover, since logging alone is performed, the directory can be created as a common directory shared by unspecified users.

For copying, the image scanner 22 is used to read an original. Read image data is sent to directory PRINT01 in the file server 21. Thereafter, the image data is transmitted to the printer 23. The printer 23 then performs printing.

Figure 7:
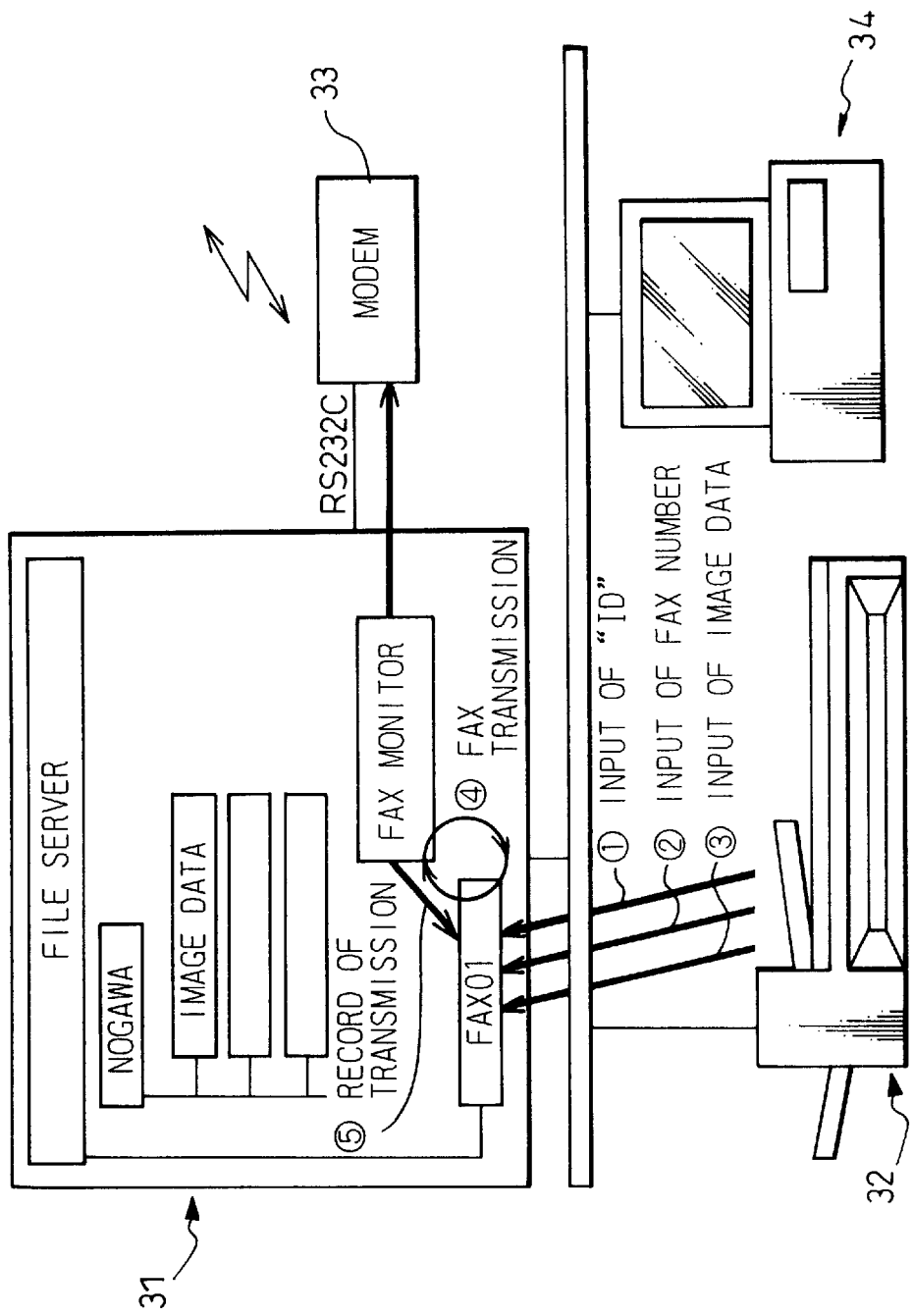
FIG. 7 is a diagram showing the configuration of a client/server type network in accordance with a third embodiment of the present invention.

FIG. 7 shows the configuration of a client/server type network in accordance with the third embodiment of the present invention. In this example, the configuration of a network over which the capability of a facsimile is used is presented.

In the drawing, reference numeral 31 denotes a file server. 32 denotes an image scanner. 33 denotes a modem serving as an output destination. 34 denotes a view station. In the file server 31, "FAX01" indicates a directory used for the capability of a facsimile. This directory is created in association with the modem 33. The directory is identified with an ID. If the directory for a facsimile is identified, the image scanner prompts entry of a facsimile number and then inputs an image.

Within the file server 31, a resident monitor program for monitoring the input of image data and outputting the image data as facsimile data to the modem 33 is produced ("FAX MONITOR" in the drawing). A transmission journal is preserved in a common directory in the same manner as that in the previous case of using the capability of a copier.

In FIG. 7, encircled numerals indicate a procedure of facsimile processing. In the case of using the capability of a facsimile, first, the image scanner 32 is used to input an ID. With the ID, the facsimile directory is identified. Thereafter, a facsimile number is input from the image scanner 32, and then image data is input from the image scanner 32.

Thereafter, the image data is converted into facsimile data, and then the facsimile data is output from FAX Monitor to the modem 33. The facsimile data is then transmitted to the input facsimile number. When facsimile transmission is completed, FAX Monitor writes a transmission record in directory FAX01.

When the image scanner is used as a facsimile, a so-called "one-touch" dialing function is available for frequently-used facsimile numbers. Owing to this function, it is possible to create a facsimile data director for each transmission destination facsimile number, and thus realize the capability of a facsimile merely with the input of an ID to be performed first.

The image scanner 32 employed in this embodiment is greatly dependent on the client/server type network. If the file server 31 has started up imperfectly, the image scanner 32 cannot operate. However, it can be determined at the time of network connection whether or not the state in which the image scanner can operate has been established. According to the result of determination, the image scanner may be halted.

While the image scanner is operating, if the file server 31 halts, a problem occurs. In this case, detection (of the fact that the file server 31 has halted) is not made until an associated directory is searched in relation to an ID input during a subsequent input operation. An error code is therefor returned during the input operation. This is not preferable.

If the file server 31 halts while the image scanner is operating, a log-off message is usually output. After detecting the message, the image scanner 32 logs off immediately and comes to a halt. It can thus be notified that the image scanner 32 is currently disabled.

Figure 8:
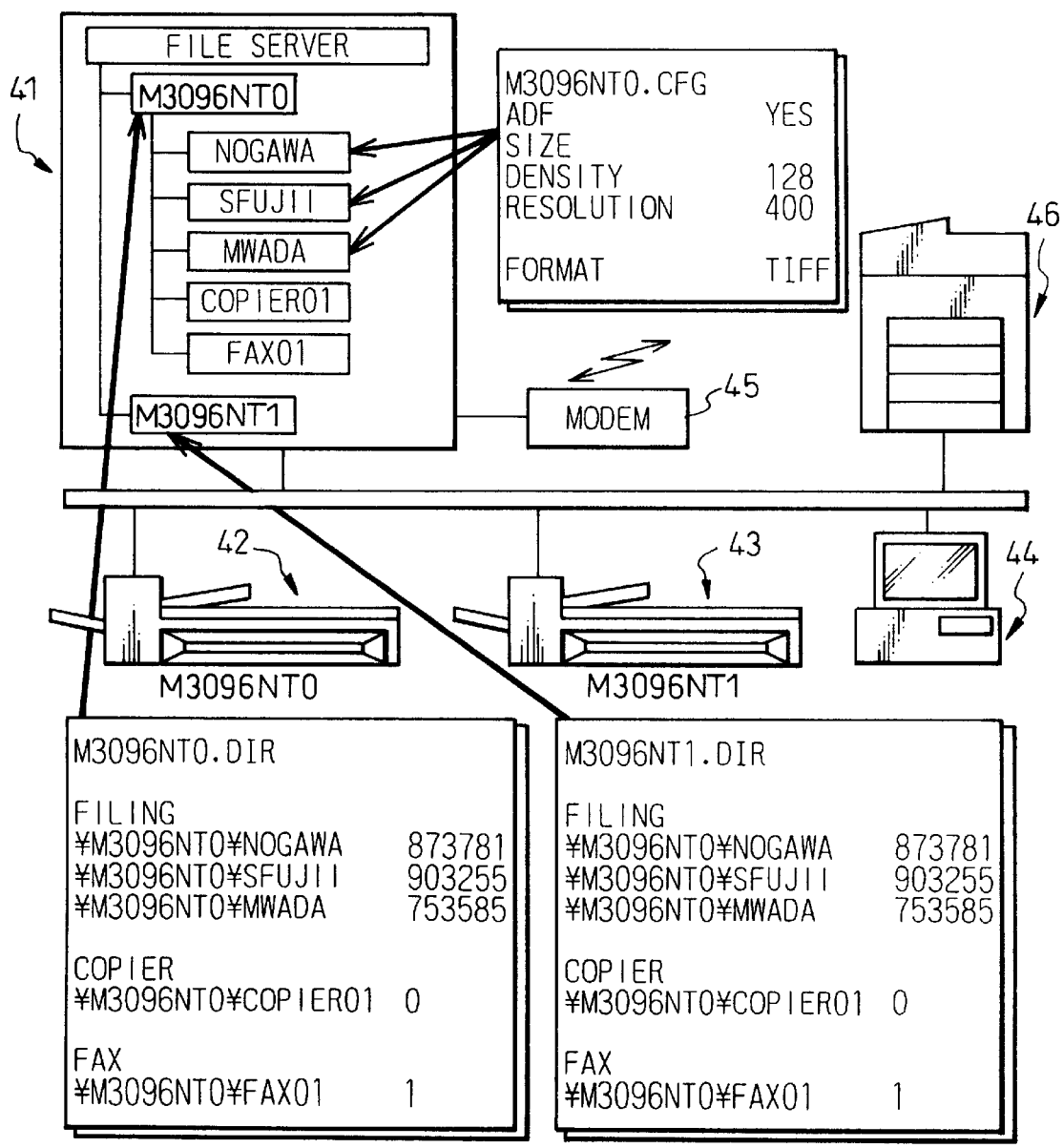
FIG. 8 is a diagram showing the configuration of a client/server type network in accordance with a fourth embodiment of the present invention.

FIG. 8 shows the configuration of a client/server type network in accordance with the fourth embodiment of the present invention. In this embodiment, an example of a configuration in which two image scanners (42, 43) are connected to one file server (41).

In the drawing, reference numeral 41 denotes a file server. 42 and 43 denote image scanners. 44 denotes a view station. 45 denotes a modem serving as an output destination. 46 denotes a printer also serving as an output destination. The image scanner 42 is assigned "M3096NT0" as a user name, while the image scanner 43 is assigned "M3096NT1" as a user name. The image scanners 42 and 43 are allocated directories "M3096NT0" and "M3096NT1" in the file server 41.

Directory M3096NT0 for the image scanner 42 has subdirectories associated with three users; NOGAWA, SFUJI, and MWADA. Moreover, subdirectory COPIER01 and subdirectory FAX01 are set for the capabilities of a copier and facsimile respectively. In contrast, no subdirectory is created within directory M3096NT1 for the image scanner 43. The contents of directory M3096NT0 are retrieved. This is realized by referencing a configuration file.

Administration software is dependent on a network OS. For example, NetWare, released by NOVELL Inc., uses a utility SYSCON to create directories. As for the capabilities of a copier and facsimile, they can be implemented using a NetWare loadable module (NLM). For these capabilities, simple IDs should merely be set. In the example shown in FIG. 8, "0" is assigned to COPIER, and "1" is assigned to FAX.

The operator panel shown in FIG. 3 is used as an operator panel. When the power supply of the image scanner 42 or 43 is turned on, the image scanner is started up and connected automatically to the file server 41. At this time, the image scanner 42 or 43 sends its own user name to the file server 41. Any file in the file server 41 can be retrieved readily by registering a user name such as M3096NT0 at the root direction by default.

After the image scanner is connected to the file server 41, a configuration file is read, and a registered ID and the presence or absence of the capabilities of a copier and facsimile are checked.

A user of the image scanner 42 or 43 first enters his/her own ID at the operator panel. This finalizes an input destination directory. The image scanner 42 or 43 reads a configuration file from the designated user directory, and displays values set in the configuration file as default values on the operator panel.

Thereafter, if setting read parameters and the like is needed, the parameter values are modified. With the press of a Start key, reading an original is started.

Image data is stored in a given directory on the basis of a name automatically produced by the image scanner 42 or 43. A compression form, file format, and the like are pre-set in a configuration file. The configuration file is an ordinary text file, and the contents of the file can be edited by a user at his/her own personal computer.

An input document is referenced or reformed at the user's own personal computer. In normal document image management (DIM), an index is set on this stage. A read image is also stored in an upper-level data base by way of a wide area network (WAN). When "0" is input as an ID from the image scanner 42 or 43, the image scanner functions as a copier. The image scanners 42 and 43 operate in the same way, and automatically output image data to the printer 46 dependently on a program within the file server 41. Even in this case, a configuration file is set in directory COPIER01.

In contrast, when "1" is input as an ID from the image scanner 42 or 43, the image scanner functions as a facsimile. The operation of the image scanner 42 or 43 is the same as that when the image scanner is used as a copier except that a facsimile number is input. Depending on a program within the file server 41, image data read by the image scanner is automatically output to the modem 45. Even in this case, a configuration file is set in directory FAX01. Incidentally, a system in which an abbreviated dialing number is registered in the configuration file and the number is selected may be adopted. A facsimile transmission journal is preserved in directory FAX01. The directory is a simple text file that can be referenced by users of a workgroup connected with the network.

Figure 9:
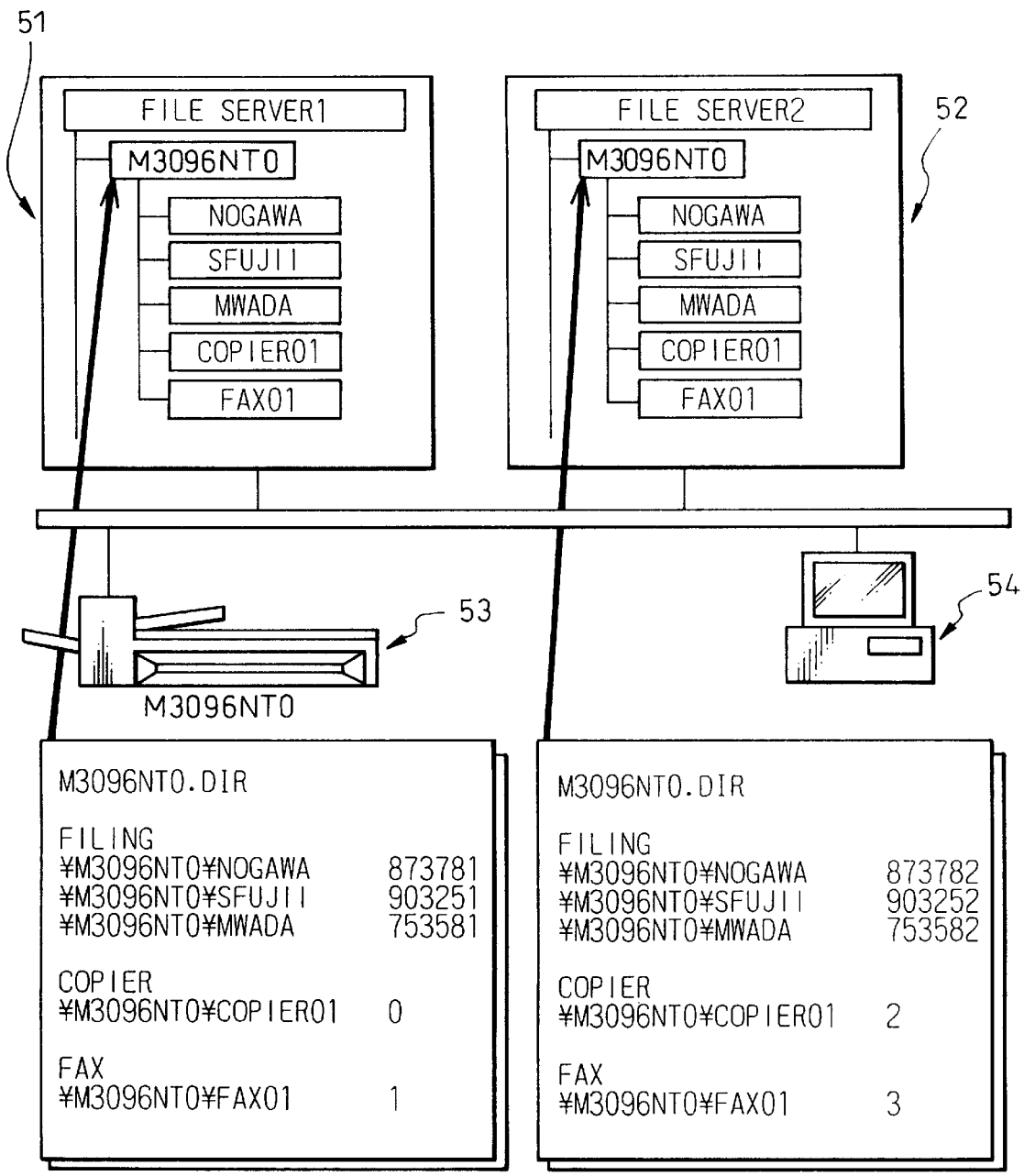
FIG. 9 is a diagram showing the configuration of a client/server type network in accordance with a fifth embodiment of the present invention.

FIG. 9 shows the configuration of a client/server type network in accordance with the fifth embodiment of the present invention. In this example, a configuration in which one image scanner (53) is connected to two file servers (51, 52) is presented.

In this embodiment, an image scanner 53 logs in with connected file servers 51 and 52 using the same user name. A user of the image scanner 53 is identified by designating inherent IDs in the file servers 51 and 52. For example, in the case of "NOGAWA," "873781" is set as an ID in the file server 51, while "873782" is set as an ID in the file server 52. Thus, either the file server 51 or 52 can be selected according to an input ID. Since the image scanner 53 has already logged in with both the file servers 51 and 52, data is preserved in the file server having an ID that agrees with an input ID.

As for the capabilities of a copier and facsimile, they need not be specified a plurality of times within a workgroup of a LAN. As presented in this embodiment, however, the capabilities of a copier and facsimile may be specified in two file servers 51 and 52. In the illustrated example, "0" is registered as an ID of a copier in the file server 51, while "2" is registered in the file server 52. Likewise, "1" is registered as an ID of a facsimile in the file server 51, while "3" is registered in the file server 52.

As described so far, in the embodiments shown in FIGS. 2 to 9, an image scanner can be connected directly with a network without the use of a keyboard. However, if a file name or the like can be entered, it will sometimes be found convenient. For this purpose, a personal digital assistant (PDA) that has begun to prevail in recent years can be employed.

Figure 10:
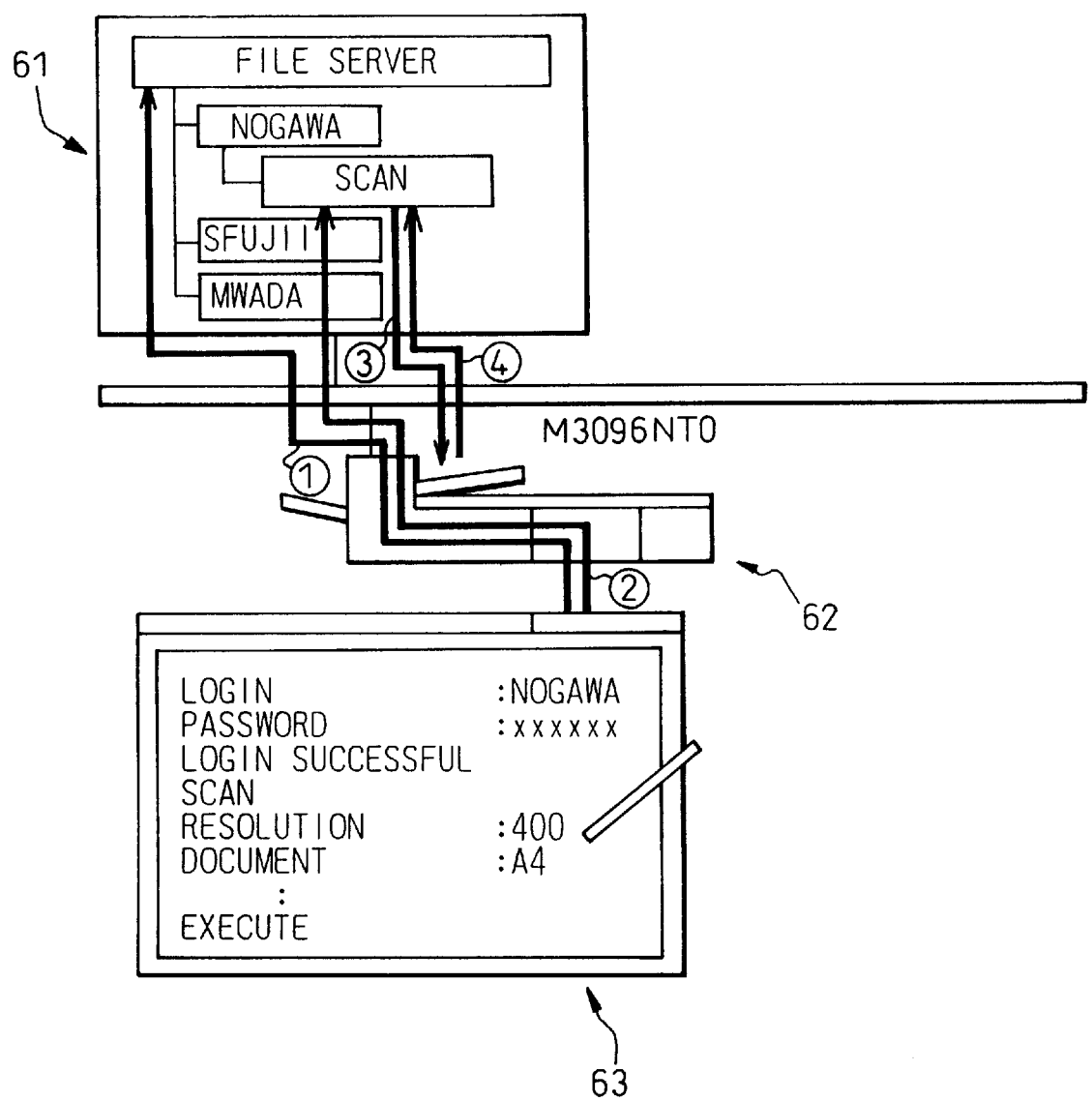
FIG. 10 is a diagram showing the configuration of a client/server type network in accordance with a sixth embodiment of the present invention.

FIG. 10 shows the configuration of a client/server type network in accordance with the sixth embodiment of the present invention. In this example, an example of a configuration using a PDA as a console is presented.

In the drawing, reference numeral 61 denotes a file server. 62 denotes an image scanner. 63 denotes a PDA. The PDA generally enables input of handwritten characters. A component used to enter characters is therefore simple. Moreover, the PDA generally has an infrared communication port. If the image scanner 62 is provided with an infrared input interface, a user interface can be realized. Thus, logging in with a network can be performed in the same manner as that in the configuration using a personal computer (PC).

In this case, the image scanner 62 does not interpret a network protocol but receives it directly from the PDA (63) via the infrared interface. The image scanner 62 can therefore be configured in the same way as an image scanner including a general-purpose interface such as an SCSI.

As for the procedure, first, the PDA 63 logs in relative to the file server 61 (processing ①). Thereafter, the PDA 63 is used to initiate a scanning program (SCAN in the FIG. 10) within the file server 61 (processing ②). This is an application, for example, DOS Windows. A read command is issued to the image scanner 62 via a device driver under user name M3096NT0 (processing ③). This command may be the same as that used for the SCSI or the like. The image scanner 62 uses, for example, Ethernet as a physical interface. Thereafter, image data is transferred from the image scanner 62 to the file server 61 (processing ④).

Figure 11:
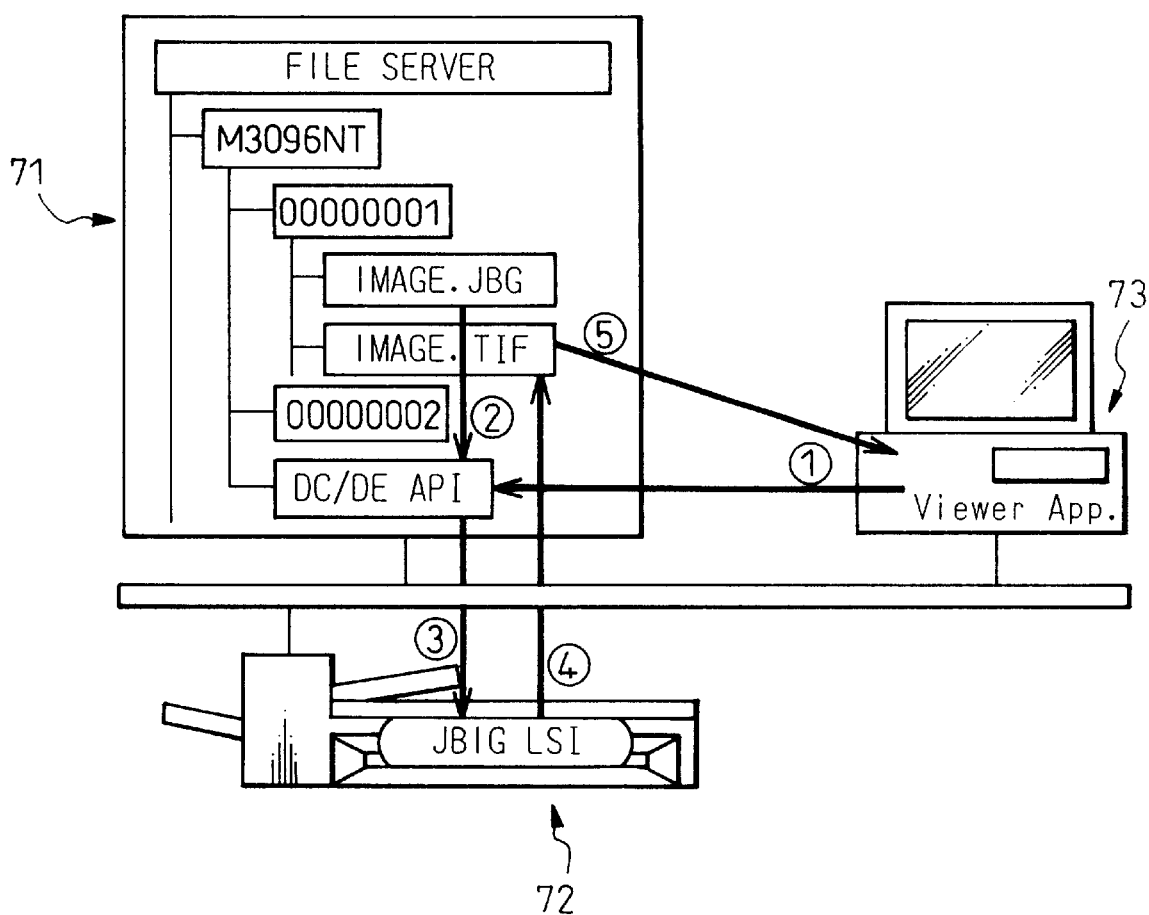
FIG. 11 is a diagram showing the configuration of a client/server type network in accordance with a seventh embodiment of the present invention.

FIG. 11 shows the configuration of a client/server type network in accordance with the seventh embodiment of the present invention. In this example, an example of using a compression/expansion function of an image scanner 72 through a view station 73 is presented.

An image scanner for filing usually preserves image data in a compressed form and therefore has a compression function. An image scanner 72 of this embodiment includes a compression/expansion unit responsible for compression and expression, a receiver for receiving image data sent from a network, and an output unit for outputting image data to the network. The compression function of the image scanner 72 is used only for reading of an original. By contrast, an LSI having a compression function usually has an expansion function, too. However, in a conventional image scanner, only the compression function is utilized. This is not economic. An image scanner used on a network can access any file in a file server. By developing an application programming interface (API), therefore, resources in the image scanner can be utilized through an application. For example, even JBIG compression and expansion can be achieved merely by invoking a compression/expansion facility in the image scanner. A compression/expansion program need not be developed as an application.

In FIG. 11, reference numeral 71 denotes a file server in which image files are stored. 72 denotes an image scanner in which a compression/expansion facility is installed. 73 denotes a view station that is a client of a LAN. Incidentally, Viewer App. indicates a general application for referencing images.

Next, a description will be made of a case in which Viewer App. displays file IMAGE.JBG that has been JBIG-compressed. In this case, assume that an application usually has a compression restoration routine such as MH, MR, MMR, or RLE but does not support JBIG. The JBIG enjoys a higher compression ratio than any other method such as the MH or MR. However, the algorithm is so complex that a processing rate is lowered. Even if a JBIG facility is installed in the image scanner, the JBIG facility will not be utilized on a network.

The image scanner makes it possible to share such an image processing facility as a network resource. In FIG. 11, DC/DE API stands for an application programming interface (API) for performing data compression and data expansion and for transferring data to or from the image scanner 72.

Viewer App. invokes the DC/DE API using file path IMAGE.JGB as an argument. The DC/DE API passes data to the image scanner 72 using a communication facility on a LAN. The image scanner 72 compresses or expands data according to the JBIG. Image data processed by the image scanner 72 is written in file IMAGE.TIF by the DC/DE API. File IMAGE.TIF is non-compressed and can therefore be output to a screen readily by Viewer App. In the drawing, encircled numerals denote orders of the above processing.

According to this embodiment, even if the image scanner 72 uses a new compression algorithm, once a simple DC/DE API is developed for the file server 71, the algorithm can be utilized readily and quickly. The unit of compression or expansion need not be a file. Compression or expansion may be performed in units of a small memory chunk.

What is claimed is:

1. A network system, comprising an image scanner that is connected to a network, and reads an image; and a file server connected to said image scanner over said network;

said image scanner includes, identification information input means for inputting one of at least one piece of identification information for each image read by said image scanner, and for indicating one of at least one directory included in said file server in which said each image is to be stored, and transfer means for transferring, to said file server, data of said each image read by said image scanner, and said one of at least one piece of identification information input for the image;

said file server includes, at least one directory, created in advance, corresponding to said at least one piece of identification information, memory means for indicating the correspondence between said at least one piece of identification information and said at least one directory; and image storage control means for storing said data of the image transferred thereto by the transfer means, in one of the at least one directory corresponding to said one of at least one piece of identification information corresponding to the image and transferred thereto by the transfer means, wherein at least a portion of said at least one directory each corresponds to a user.

2. A network system, comprising an image scanner that is connected to a network, and reads an image; and a file server connected to said image scanner over said network;

said image scanner includes, identification information input means for inputting one of at least one piece of identification information for each image read by said image scanner, and for indicating one of at least one directory included in said file server in which said each image is to be stored, and transfer means for transferring, to said file server, data of said each image read by said image scanner, and said one of at least one piece of identification information input for the image;

said file server includes, at least one directory, created in advance, corresponding to said at least one piece of identification information, memory means for indicating the correspondence between said at least one piece of identification information and said at least one directory; and image storage control means for storing said data of the image transferred thereto by the transfer means, in one of the at least one directory corresponding to said one of at least one piece of identification information corresponding to the image and transferred thereto by the transfer means, wherein said file server includes an administration means for controlling access to said directories, and information concerning a name of said image scanner input from said image scanner is registered as a user name in said memory means.

3. A network system, comprising
an image scanner that is connected to a network, and reads an image; and
a file server connected to said image scanner over said network;
said image scanner includes,
   identification information input means for inputting one of at least one piece of identification information for each image read by said image scanner, and for indicating one of at least one directory included in said file server in which said each image is to be stored, and
   transfer means for transferring, to said file server, data of said each image read by said image scanner, and said one of at least one piece of identification information input for the image;
said file server includes,
   at least one directory, created in advance, corresponding to said at least one piece of identification information,
   memory means for indicating the correspondence between said at least one piece of identification information and said at least one directory; and
   image storage control means for storing said data of the image transferred thereto by the transfer means, in one of the at least one directory corresponding to said one of at least one piece of identification information corresponding to the image and transferred thereto by the transfer means,
wherein after read image data is stored in any of said directories, said image scanner outputs a message reporting the completion of reading to said network.

4. A network system, comprising
an image scanner that is connected to a network, and reads an image; and
a file server connected to said image scanner over said network;
said image scanner includes,
   identification information input means for inputting one of at least one piece of identification information for each image read by said image scanner, and for indicating one of at least one directory included in said file server in which said each image is to be stored, and
   transfer means for transferring, to said file server, data of said each image read by said image scanner, and said one of at least one piece of identification information input for the image;
said file server includes,
   at least one directory, created in advance, corresponding to said at least one piece of identification information,
   memory means for indicating the correspondence between said at least one piece of identification information and said at least one directory; and
   image storage control means for storing said data of the image transferred thereto by the transfer means, in one of the at least one directory corresponding to said one of at least one piece of identification information corresponding to the image and transferred thereto by the transfer means,
wherein at least a portion of said at least one directory each corresponds to one of at least one printer which is to be connected to said network, and said file server further comprises output-to-printer means for outputting image data stored in each directory of said at least a portion to said one of the at least one printer corresponding to said each directory.

5. A network system, comprising
an image scanner that is connected to a network, and reads an image; and
a file server connected to said image scanner over said network;
said image scanner includes,
   identification information input means for inputting one of at least one piece of identification information for each image read by said image scanner, and for indicating one of at least one directory included in said file server in which said each image is to be stored, and
   transfer means for transferring, to said file server, data of said each image read by said image scanner, and said one of at least one piece of identification information input for the image;
said file server includes,
   at least one directory, created in advance, corresponding to said at least one piece of identification information, memory means for indicating the correspondence between said at least one piece of identification information and said at least one directory; and
   image storage control means for storing said data of the image transferred thereto by the transfer means, in one of the at least one directory corresponding to said one of at least one piece of identification information corresponding to the image and transferred thereto by the transfer means,
further comprising a facsimile server for performing facsimile transmission,
one of said at least one directory is provided for storing image data which is to be transmitted by said facsimile server,
one piece of said at least one piece of identification number is predetermined for indicating a request for facsimile transmission of image data corresponding to said one piece of identification number,
said image scanner further comprising facsimile number input means for inputting a facsimile number of a destination to which said image data is to be transmitted by the facsimile transmission, after said one piece of identification number is input by said identification information input means, and
said transfer means further transfers, to said file server, said facsimile number.

6. A network system, comprising:
an image scanner that is connected to a network, reads an image, and includes compression/expansion means for compressing or expanding data including image data;
a terminal connected to said image scanner over said network; and
a file server that is connected to said image scanner and said terminal over said network and includes a memory means in which image data is stored,
said terminal comprises
   command input means for receiving a command input to utilize said compression/expansion means, and for transmitting an instruction for the utilization of said compression/expansion means to said file server in response to the command input;
said file server comprises
   instruction receiving means for receiving the instruction from the terminal, and
   compression/expansion request means for transmitting to the image scanner a request for the utilization of said compression/expansion means and image data stored in said memory means, in response to the reception of the instruction from the terminal; and said image scanner comprises request receiving means for receiving the request and the image data from the file server, and compression/expansion activating means for activating the compression/expansion means so that the image data received from the file server is compressed or expanded, in response to the reception of the request from the file server.

7. A network system, comprising an image scanner that is connected to a network, and reads an image; and a file server connected to said image scanner over said network;

said image scanner includes, identification information input means for inputting one of at least one piece of identification information for each image read by said image scanner, and for indicating one of at least one directory included in said file server in which said each image is to be stored, and transfer means for transferring, to said file server, data of said each image read by said image scanner, and said one of at least one piece of identification information input for the image;

said file server includes, at least one directory, created in advance, corresponding to said at least one piece of identification information, memory means for indicating the correspondence between said at least one piece of identification information and said at least one directory; and image storage control means for storing said data of the image transferred thereto by the transfer means, in one of the at least one directory corresponding to said one of at least one piece of identification information corresponding to the image and transferred thereto by the transfer means, wherein said image scanner includes means for receiving a message that is output just before said file server halts, means for disconnecting the link with said network by receiving said message, and means for notifying a user of the fact that said image scanner is disabled.

8. A network system, comprising an image scanner that is connected to a network, and reads an image; and a file server connected to said image scanner over said network;

said image scanner includes, identification information input means for inputting one of at least one piece of identification information for each image read by said image scanner, and for indicating one of at least one directory included in said file server in which said each image is to be stored, and transfer means for transferring, to said file server, data of said each image read by said image scanner, and said one of at least one piece of identification information input for the image;

said file server includes, at least one directory, created in advance, corresponding to said at least one piece of identification information, memory means for indicating the correspondence between said at least one piece of identification information and said at least one directory; and image storage control means for storing said data of the image transferred thereto by the transfer means, in one of the at least one directory corresponding to said one of at least one piece of identification information corresponding to the image and transferred thereto by the transfer means, wherein said image scanner includes a memory for storing an identification code inherent to said image scanner, and a control unit for outputting said identification code to said network when the power supply is turned on and for handling connection with said network.

9. A network system, comprising an image scanner that is connected to a network, and reads an image; and a file server connected to said image scanner over said network;

said image scanner includes, identification information input means for inputting one of at least one piece of identification information for each image read by said image scanner, and for indicating one of at least one directory included in said file server in which said each image is to be stored, and transfer means for transferring, to said file server, data of said each image read by said image scanner, and said one of at least one piece of identification information input for the image;

said file server includes, at least one directory, created in advance, corresponding to said at least one piece of identification information, memory means for indicating the correspondence between said at least one piece of identification information and said at least one directory; and image storage control means for storing said data of the image transferred thereto by the transfer means, in one of the at least one directory corresponding to said one of at least one piece of identification information corresponding to the image and transferred thereto by the transfer means, wherein: said image scanner includes, a receiver for receiving image data sent from said network, and an instruction for compressing or expanding of said image data, a compression/expansion unit for compressing or expanding said image data received by the receiver, in response to said instruction, and an output unit for outputting image data processed by said compression/expansion unit to said network.

10. A network system, comprising an image scanner that is connected to a network, and reads an image; and a file server connected to said image scanner over said network;

said image scanner includes, identification information input means for inputting one of at least one piece of identification information for each image read by said image scanner, and for indicating one of at least one directory included in said file server in which said each image is to be stored, and transfer means for transferring, to said file server, data of said each image read by said image scanner, and said one of at least one piece of identification information input for the image;

said file server includes,
  at least one directory, created in advance, corresponding to said at least one piece of identification information,
  memory means for indicating the correspondence between said at least one piece of identification information and said at least one directory; and
  image storage control means for storing said data of the image transferred thereto by the transfer means, in one of the at least one directory corresponding to said one of at least one piece of identification information corresponding to the image and transferred thereto by the transfer means,
further comprising a facsimile server for performing facsimile transmission,
each directory of at least a portion of said at least one directory corresponds to one of at least one destination to which image data stored in said each directory is to be transmitted by said facsimile server, and
each of at least a portion of said at least one piece of identification number is predetermined corresponding to a facsimile number of one of said at least one destination.

11. An image scanner for reading an image, comprising:
identification information input means for inputting one of at least one piece of identification information, for each image read by said image scanner, the identification information indicating one of at least one directory included in a file server in said each image is to be stored, and
transmitting means for transmitting, to the file server, data of said each image read by said image scanner, and said one of at least one piece of identification information input for the image, when the file server is connected with said image scanner, and
means for outputting a message reporting completion of reading to said file server.

12. An image scanner, for reading an image, comprising:
identification information input means for inputting one of at least one piece of identification information, for each image read by said image scanner, the identification information indicating one of at least one directory included in a file server in said each image is to be stored, and
transmitting means for transmitting, to the file server, data of said each image read by said image scanner, and said one of at least one piece of identification information input for the image, when the file server is connected with said image scanner,
facsimile number input means for inputting a facsimile number of a destination to which image data is to be transmitted by facsimile transmission, after one piece of identification number corresponding to the image data is input by said identification information input means, where said one piece of said at least one piece of identification number is predetermined for indicating a request for facsimile transmission of the image data corresponding to said one piece of identification number, and
said transmitting means further transmits, to said file server, said facsimile number.

13. An image scanner, for reading an image, comprising:
identification information input means for inputting one of at least one piece of identification information, for each image read by said image scanner, the identification information indicating one of at least one directory included in a file server in said each image is to be stored, and
transmitting means for transmitting, to the file server, data of said each image read by said image scanner, and said one of at least one piece of identification information input for the image, when the file server is connected with said image scanner,
means for receiving a message that is output from said file server when said file server halts,
means for disconnecting the link with said file server in response to reception of said message, and
means for notifying a user that said image scanner is disabled.

14. An image scanner for reading an image, comprising:
identification information input means for inputting one of at least one piece of identification information, for each image read by said image scanner, the identification information indicating one of at least one directory included in a file server in said each image is to be stored, and
transmitting means for transmitting, to the file server, data of said each image read by said image scanner, and said one of at least one piece of identification information input for the image, when the file server is connected with said image scanner,
a memory for storing an identification code inherent to said image scanner, and
a control unit for outputting said identification code to said file server when the power supply is turned on and for handling connection with said file server.

15. An image scanner for reading an image, comprising:
identification information input means for inputting one of at least one piece of identification information, for each image read by said image scanner, the identification information indicating one of at least one directory included in a file server in said each image is to be stored, and
transmitting means for transmitting, to the file server, data of said each image read by said image scanner, and said one of at lest one piece of identification information input for the image, when the file sever is connected with said image scanner,
a receiver for receiving image data sent from said file server, and an instruction for compressing or expanding of said image data,
a compression/expansion unit for compressing or expanding said image data received by the receiver, in response to said instruction, and
and output unit for outputting image data processed by said compression/expansion unit to said file server.

16. A server comprising:
at least one directory created in advance corresponding to at least one piece of identification information which identifies into which directory of said file server image data is to be stored;
memory means for indicating the correspondence between said at least one piece of identification information and said at least one directory;
receiving means for receiving one of said at least one piece of identification information for the image data; and
image storage control means for storing the image data received by the receiving means, in one of the at least one directory corresponding to said one of at least one piece of identification information for the image, wherein said file server includes an administration means for controlling access to said directories, and information concerning a name of said image scanner input from said image scanner is registered as a user name in said memory means.

17. A file server comprising:

at least one directory created in advance corresponding to at least one piece of identification information which identifies into which directory of said file server image data is to be stored;

memory means for indicating the correspondence between said at least one piece of identification information and said at least one directory;

receiving means for receiving one of said at least one piece of identification information for the image data; and image storage control means for storing the image data received by the receiving means, in one of the at least one directory corresponding to said one of at least one piece of identification information for the image, wherein at least a portion of said at least one directory each corresponds to one of at least one printer which is to be connected to said file server, and said file server further comprises output-to-printer means for outputting image data stored in each directory of said at least a portion to said one of said at least one printer corresponding to said each directory.

18. A file server comprising:

at least one directory created in advance corresponding to at least one piece of identification information which identifies into which directory of said file server image data is to be stored;

memory means for indicating the correspondence between said at least one piece of identification information and said at least one directory;

receiving means for receiving one of said at least one piece of identification information for the image data; and image storage control means for storing the image data received by the receiving means, in one of the at least one directory corresponding to said one of at least one piece of identification information for the image, wherein one of said at least one directory is provided for storing image data which is to be transmitted by facsimile.

19. A file server comprising:

at least one directory created in advance corresponding to at least one piece of identification information which identifies into which directory of said file server image data is to be stored;

memory means for indicating the correspondence between said at least one piece of identification information and said at least one directory;

receiving means for receiving one of said at least one piece of identification information for the image data; and image storage control means for storing the image data received by the receiving means, in one of the at least one directory corresponding to said one of at least one piece of identification information for the image, wherein each directory of at least a portion of said at least one directory corresponds to one of at least one destination to which image data stored in said each directory is to be transmitted by facsimile, and each of at least a portion of said at least one piece of identification number is predetermined corresponding to a facsimile number of one of said at least one destination.

20. An image scanner comprising:

image reading means for reading an image;

compression/expansion means for compressing or expanding data including image data;

request receiving means for receiving, from outside the image scanner, image data and a request for compressing or expanding the image data, and compression/expansion activating means for activating the compression/expansion means so that the received image data is compressed or expanded.

21. A file server comprising:

memory means in which image data is stored, instruction receiving means for receiving an instruction for the utilization of a compression/expansion means from a terminal which is connected to a network, when said file server is connected to the network;

compression/expansion request means for transmitting to an image scanner a request for the utilization of said compression/expansion means and image data stored in said memory means, in response to the reception of the instruction from the terminal, when said image scanner is connected to the network.

22. A product for use with an image scanner for reading an image, said product, when used with said image scanner, being able to output control information which directs the image scanner, said product comprising:

identification information input means for inputting one of at least one piece of identification information, for each image read by said image scanner, the identification information indicating one of at least one directory included in a file server in said each image is to be stored, and transmitting means for transmitting, to the file server, data of said each image read by said image scanner, and said one of at least one piece of identification information input for the image, when the file server is connected with said image scanner, and means for outputting a message reporting completion of reading to said file server.

23. A product for use with an image scanner for reading an image, said product, when used with said image scanner, being able to output control information which directs the image scanner, said product comprising:

identification information input means for inputting one of at least one piece of identification information, for each image read by said image scanner, the identification information indicating one of at least one directory included in a file server in said each image is to be stored, and transmitting means for transmitting, to the file server, data of said each image read by said image scanner, and said one of at least one piece of identification information input for the image, when the file server is connected with said image scanner, and facsimile number input means for inputting a facsimile number of a destination to which image data is to be transmitted by facsimile transmission, after one piece of identification number corresponding to the image data is input by said identification information input means, wherein said one piece of said at least one piece of identification number is predetermined for indicating a request for facsimile transmission of the image data corresponding to said one piece of identification number, and said transmitting means further transmits, to said file server, said facsimile number.

24. A product for use with an image scanner for reading an image, said product, when used with said image scanner, being able to output control information which directs the image scanner, said product comprising:

identification information input means for inputting one of at least one piece of identification information, for each image read by said image scanner, the identification information indicating one of at least one directory included in a file server in said each image is to be stored, and transmitting means for transmitting, to the file server, data of said each image read by said image scanner, and said one of at least one piece of identification information input for the image, when the file server is connected with said image scanner, means for receiving a message that is output from said file server just before said file server halts, means for disconnecting the link with said file server in response to reception of said message, and means for notifying a user that said image scanner is disabled.

25. A product for use with an image scanner for reading an image, said product, when used with said image scanner, being able to output control information which directs the image scanner, said product comprising:

identification information input means for inputting one of at least one piece of identification information, for each image read by said image scanner, the identification information indicating one of at least one directory included in a file server in said each image is to be stored, and transmitting means for transmitting, to the file server, data of said each image read by said image scanner, and said one of at least one piece of identification information input for the image, when the file server is connected with said image scanner, a memory for storing an identification code inherent to said image scanner, and a control unit for outputting said identification code to said file server when the power supply is turned on and for handling connection with said file server.

26. A product for use with an image scanner for reading an image, said product, when used with said image scanner, being able to output control information which directs the image scanner, said product comprising:

identification information input means for inputting one of at least one piece of identification information, for each image read by said image scanner, the identification information indicating one of at least one directory included in a file server in said each image is to be stored, and transmitting means for transmitting, to the file server, data of said each image read by said image scanner, and said one of at least one piece of identification information input for the image, when the file server is connected with said image scanner, a receiver for receiving image data sent from said file server, and an instruction for compressing or expanding said image data, a compression/expansion unit for compressing or expanding said image data received by the receiver, in response to said instruction, and an output unit for outputting image data processed by said compression/expansion unit to said file server.

27. A product for use with a file server for reading an image, said product, when used with said file server, being able to output control information which directs the file server, said product comprising:

at least one directory, created in advance, corresponding to at least one piece of identification information which identifies into which directory of said file server image data is to be stored;

memory means for indicating the correspondence between said at least one piece of identification information and said at least one directory;

receiving means for receiving one of said at least one piece of identification information for the image data; and image storage control means for storing the image data received by the receiving means, in one of the at least one directory corresponding to said one of at least one piece of identification information for the image, wherein said file server includes an administration means for controlling access to said directories, and information concerning a name of said image scanner input from said image scanner is registered as a user name in said memory means.

28. A product for use with a file server for reading an image, said product, when used with said file server, being able to output control information which directs the file server, said product comprising:

at least one directory, created in advance, corresponding to at least one piece of identification information which identifies into which directory of said file server image data is to be stored;

memory means for indicating the correspondence between said at least one piece of identification information and said at least one directory;

receiving means for receiving one of said at least one piece of identification information for the image data; and image storage control means for storing the image data received by the receiving means, in one of the at least one directory corresponding to said one of at least one piece of identification information for the image, wherein at least a portion of said at least one directory each corresponds to one of at least one printer which is to be connected to said file server, and said file server further comprises output-to-printer means for outputting image data stored in each directory of said at least a portion to said one of said at least one printer corresponding to said each directory.

29. A product for use with a file server for reading an image, said product, when used with said file server, being able to output control information which directs the file server, said product comprising:

at least one directory, created in advance, corresponding to at least one piece of identification information which identifies into which directory of said file server image data is to be stored;

memory means for indicating the correspondence between said at least one piece of identification information and said at least one directory;

receiving means for receiving one of said at least one piece of identification information for the image data; and image storage control means for storing the image data received by the receiving means, in one of the at least one directory corresponding to said one of at least one piece of identification information for the image, wherein one of said at least one directory is provided for storing image data which is to be transmitted by facsimile.

30. A product for use with a file server for reading an image, said product, when used with said file server, being able to output control information which directs the file server, said product comprising:

at least one directory, created in advance, corresponding to at least one piece of identification information which identifies into which directory of said file server image data is to be stored;

memory means for indicating the correspondence between said at least one piece of identification information and said at least one directory;

receiving means for receiving one of said at least one piece of identification information for the image data; and image storage control means for storing the image data received by the receiving means, in one of the at least one directory corresponding to said one of at least one piece of identification information for the image, wherein each directory of at least a portion of said at least one directory corresponds to one of at least one destination to which image data stored in said each directory is to be transmitted by facsimile, and each of at least a portion of said at least one piece of identification number is predetermined corresponding to a facsimile number of one of said at least one destination.

31. A product for use with an image scanner for reading an image, said product, when used with said image scanner, being able to output control information which directs the image scanner, said product comprising:

image reading means for reading an image;

compression/expansion means for compressing or expanding data including image data;

request receiving means for receiving, from outside the image scanner, image data and a request for compressing or expanding the image data, and compression/expansion activating means for activating the compression/expansion means so that the received image data is compressed or expanded.

32. A product for use with a file server for reading an image, said product, when used with said file server, being able to output control information which directs the file server, said product comprising:

memory means in which image data is stored, instruction receiving means for receiving an instruction for the utilization of a compression/expansion means from a terminal which is connected to a network, when said file server is connected to the network;

compression/expansion request means for transmitting to an image scanner a request for the utilization of said compression/expansion means and image data stored in said memory means, in response to the reception of the instruction from the terminal, when said image scanner is connected to the network.

33. A network system, comprising:

an image scanner for reading an image;

an indication information input means for inputting indication information for identifying each user of said image scanner;

a file server for storing the image read by said image scanner; and a network for connecting between said image scanner and file server, wherein said indication information input means provides the input indication information to said image scanner, said image scanner transfers the read image together with the provided indication information to said file server via said network, and said file server has a main-directory corresponding to said image scanner that includes sub-directories each of which corresponds to the indication information, and stores said image received from said network into one of said sub-directories that corresponds to the indication information received.

34. The network system according to claim 33, wherein said indication information input means is installed in said image scanner.

35. The network system according to claim 33, further comprising a wireless communication interface for connecting wirelessly between said image scanner and said indication information input means, wherein said indication information input means provides the input indication information to said image scanner via said wireless communication interface.

* * * * *